May 27, 1969   L. J. MORGAN   3,446,940
HINGEDLY MOUNTED ELECTRIC WATER HEATER
Filed Sept. 8, 1966   Sheet 1 of 2
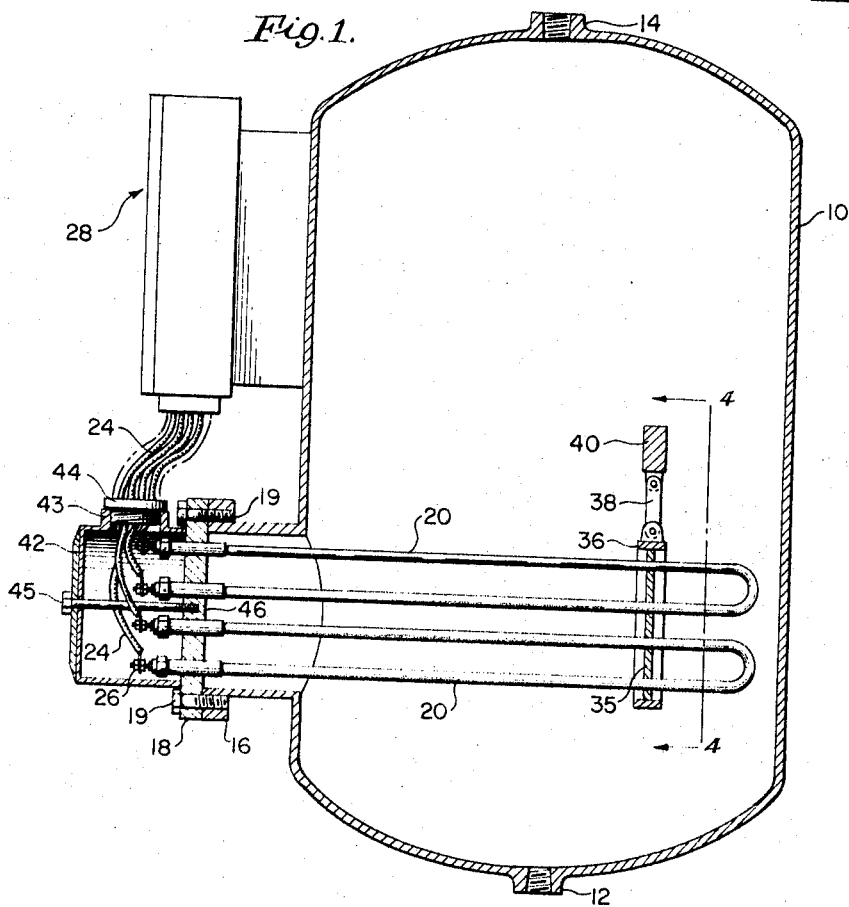
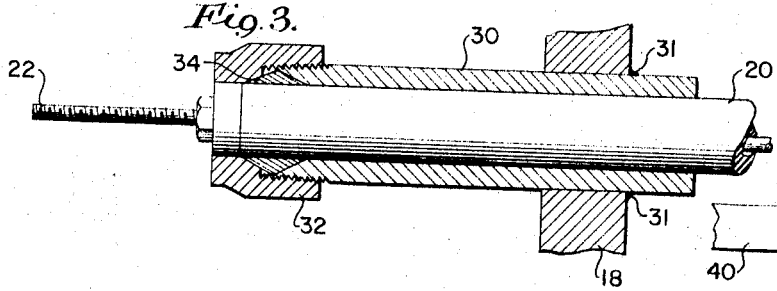
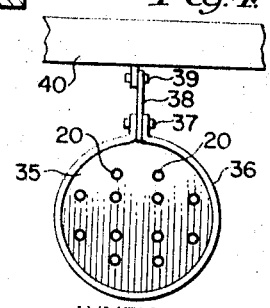
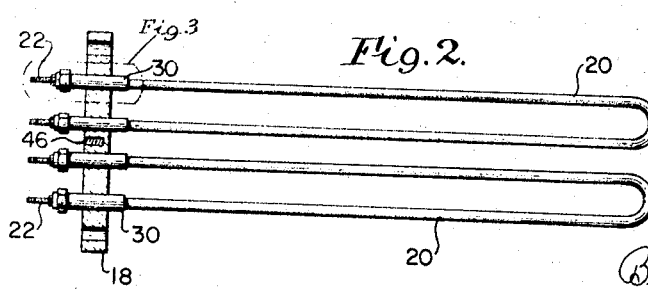
INVENTOR.
LEMUEL J. MORGAN
BY
Bean, Brooks, Buckley & Bean
ATTORNEYS

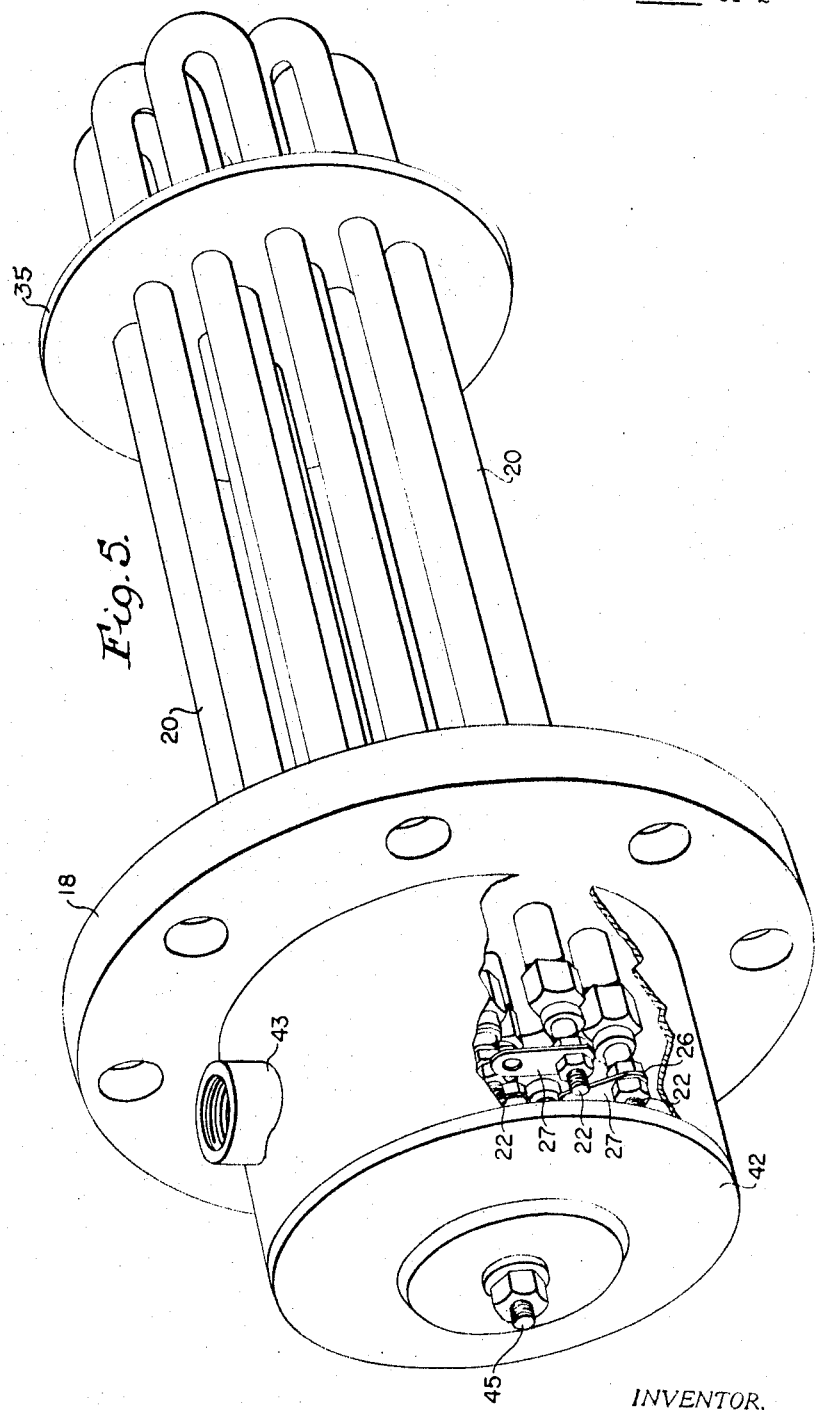

United States Patent Office 3,446,940
Patented May 27, 1969

3,446,940
HINGEDLY MOUNTED ELECTRIC
WATER HEATER
Lemuel J. Morgan, Stroudsburg, Pa., assignor to The
Patterson-Kelley Co., Inc., East Stroudsburg, Pa.
Filed Sept. 8, 1966, Ser. No. 577,984
Int. Cl. H05b 1/00, 3/02, 3/80
U.S. Cl. 219—318                                      1 Claim

ABSTRACT OF THE DISCLOSURE

In a liquid container, an immersion-type heater device is swingably mounted to accommodate length variation of said heater device. The device includes a pivotally mounted support, a plurality of removable heater rods and a header sheet. The header sheet is provided with ferrule devices and threadably mounted packing glands enclosing deformable packing seals to fluid-seal said removable heater rods relative to said ferrule devices.

---

This invention relates to water or other liquid heaters, and more particularly to improvements in water heaters employing "immersion" type heat generating electrical resistance conductors or "blades," for institutional, industrial, commercial and domestic water heating purposes and the like.

It is an object of the present invention to provide in a heater as aforesaid an improved heater blade mounting arrangement.

Another object is to provide in a heater as aforesaid an improved heater element suspension system.

More specifically it is an object of the invention to provide an improved heating element header sheet in combination with a novel heater blade mounting ferrule arrangement, whereby individual blades may be replaced with improved facility.

Another specific object of the invention is to provide in a heater as aforesaid improved suspension means supporting the horizontally elongate heater blade members interiorly of the storage tank in improved manner.

Other objects and advantages of the invention will appear from the specification hereinafter and the accompanying drawing wherein:

FIG. 1 is a vertical sectional view through a water heater device illustrating by way of one example an embodiment of the present invention;

FIG. 2 is a disassembled view, partly in section, of the heating element device of FIG. 1;

FIG. 3 is a fragmentary enlarged scale sectional view taken as indicated by the encirclement designated FIG. 3 at FIG. 2;

FIG. 4 is a fragmentary sectional view taken as indicated by line 4—4 of FIG. 1; and FIG. 5 is a perspective disassembled view of another form of heating element constructed in accord with the present invention.

As shown in the drawing herewith, the invention may be embodied in a heater device comprising a water heating-storage tank 10 having a cold water inlet as indicated at 12 and a hot water outlet connection as indicated at 14. The tank wall structure is provided with a necked port portion flanged as indicated at 16 to accommodate in bolted relation thereon a heating element "header sheet" 18 by means of bolts 19. The heating element blades are illustrated at 20, and are shown to be of return-bent or U-shaped form; it being understood of course that each blade 20 comprises a tubular sheath enclosing an electrically conductive high resistive element spaced from and supported relative to the sheath by a filling an electrically-insulating and heat-conducting material. At its opposite ends each resistance conductor is electrically connected to a terminal pin such as indicated at 22 (FIGS. 2, 5) to which power supply lead wires 24 may be directly connected such as by means of terminal eye and lock nut devices as indicated at 26 (FIG. 1). Or as indicated at 27 (FIG. 5) the conductors may be intermediately interconnected in series (or parallel) prior to final connections to the lead wires 24. The lead wires 24 connect of course to any suitable electrical supply source, typically via a thermostatically controlled switch-terminal box such as indicated at 28 (FIG. 1). It is to be understood however that the electrical supply and control arrangement may be of any preferred type, and comprises no part of the present invention.

In accordance with the present invention the header sheet is perforated to receive the heating blades therethrough; the header apertures being dimensioned, as shown in FIGS. 1, 2, 3, to accommodate in liquid-sealing relation therein ferrule devices 30 which close-fit upon the sheath portions of the heating blades 20 as they extend through the header member 18. The ferrule fittings 30 are preferably welded, or soldered, or the like as indicated at 31 (FIG. 3) to the header sheet to provide a permanently liquid-tight connection therebetween. Each ferrule fitting is terminally threaded to accommodate in screw-threaded relation thereon a nut-shaped packing gland 32 enclosing therebetween a deformable packing seal 34 (FIG. 3). Thus, upon initial installation, the header-ferrule unit may be equipped with a battery of heater "blades" by simply slip-fitting the terminal ends thereof through the ferrule fittings 30 and then locking the parts in fluid-tight connected relation by turning down the nuts 32.

Thus the ferrule fittings 30 support the heating blades 20 in horizontally extending cantilever mounted manner, but because of the substantial horizontal extents of the blades I prefer to also provide a secondary support for the blades as shown in FIGS. 1, 4. This secondary support means comprises a vertically disposed metal disc 35 carried by a ring-shaped support 36 which in turn is pivotally suspended as indicated at 37 to a suspension link 38 (FIGS. 1, 4) which in turn is pivotally suspended as indicated at 39 from a cross bar or beam member 40 which is fixed to the wall of the tank 10 to extend horizontally and transversely of the interior thereof. Thus it will be understood that whereas the terminal end portions of the heater elements are fixedly mounted in the header plate 18, the horizontally extending body portions thereof are vertically supported by means of the support plate 35; the latter being free to positionally shift laterally as viewed in FIG. 1 in response to temperature change-induced length changes of the blades 20, without introduction of any attitude changes of the support plate 35. Thus, the support plate 35 remains at all times in a precisely vertical attitude (and therefore normal to the direction of extent of the blades) while being free to float in either direction longitudinally of the blades to accommodate temperature-change induced length variations of the blade members per se.

As shown in FIGS. 1, 5, the terminal ends of the blades 20 and their electrical connections with the lead wires 24 are preferably enclosed within a detachable cover 42 which includes an inlet port 43 which is internally threaded to accommodate a bushing 44 through which the connecting lead wires 24 extend. A stay-bolt 45 is provided to detachably lock the cover 42 in operative position as shown in FIGS. 1, 5; the stay-bolt 45 being arranged to screw-threadedly engage a bored portion 46 (FIG. 1) of the header plate 18. Thus, it will be appreciated that the heater construction of the present invention provides an organization of readily mountable and/or replaceable parts wherein the temperature responsive dimensionally changing elements are supported in such manner as to be free to respond to temperature change conditions without subjecting the structure to any appreciable stresses.

It is a particular feature of the present invention that by virtue of the arrangement illustrated and described hereinabove, in the event one or more of the heating "blades" require replacement the repair may be made immediately and with facilities typically available at the point of use of the equipment. This feature not only renders it expedient to locally effect prompt replacements of failing heater blades, but it also achieves an improved practical design parameter with respect to the number of blades that may be incorporated in a single heating unit carried by a single header plate. It has heretofore been feasible only to incorporate a relatively small number of heater blades in a single unit (mounted on the same header plate) because of the ever-present possibility that failure of one or more blades will necessitate removal of the entire unit and replacement thereof. For example, a unit embodying an assembly of say six to nine blades will cost somewhere between two hundred dollars and four hundred dollars, depending upon the size of blades used, whereas many heater installations will require the use of three or four times that many blades. If all of the blades required in a given installation were to be incorporated (in accordance with prior art arrangements) in a single unit, upon failure of only one or a few of the blades the entire unit would have to be removed and scrapped, or else returned to "the factory" for repair. Hence, in such cases the repair operation is unduly expensive and necessarily involves heavy operational time losses.

However, in the case of the present invention it is practicable for the total prescribed number of heater blades to be incorporated in the design of a single unit, carried by a single header plate. In the event of failure of one or more or the blades they may be quickly and inexpensively replaced by relatively unskilled, locally available, mechanics. The packing nuts associated with the defective blade or blades are simply slacked off; the terminal devices are disconnected; and the defective blade or blades are slipped out of the header and then replaced by a reversal of the process. Thus, in the case of the present invention it is required only to maintain on hand a supply of replacement blades which may be installed whenever required, thereby involving minimum repair parts costs and shutdown time losses. Furthermore, it will be apparent that the original equipment cost will be much less in the case of the present invention because it permits the incorporation of any desired number of heater blades in a single unit carried by a single header plate, thereby avoiding undesirable overall design problems concomitant with the use of pluralities of heating units, each embodying only a relatively small number of blades mounted on a plurality of headers.

Also, it will be understood that although only a few forms of water heater constructions embodying the invention have been illustrated and described in detail by way of example herein, various changes may be made therein without departing from the spirit of the invention or the scope of the following claim.

I claim:
1. In a liquid heater comprising a liquid container and an immersion type heating device extending thereinto, said heating device including, in combination, a header sheet covering an opening through a wall portion of said container, and a plurality of heating elements of elongate form mounted each at one end thereof upon and extending through said header sheet and into the interior of said container, the improvement comprising:
   said header sheet including ferrule devices extending beyond the outer face of said header sheet and fixed thereto in fluid-tight relation, said ferrule devices being inner-diametered to slide-fit accommodate said heating elements therethrough and each being screw-threaded at its outer end,
   packing gland devices encircling said heating elements and adjustably screw-threaded upon said outer ends of said ferrule devices and including deformable packing seal, said packing seals being adapted to be deformed upon adjustment of said gland devices on said outer ends of said ferrules to effect fluid-sealing of said heating elements relative to said ferrule devices, said gland devices being releasable to permit removal of any one or more of said elements from said header sheet for replacement independently of the other of said elements,
   a support member traversing the interior of said container, and
   a hanger device for providing vertical support for the ends of said heating elements extending into the interior of said container, said hanger device including a support plate apertured to accommodate said heating elements in extending relation therethrough and a suspension link, said suspension link being pivotally suspended from said support member and said support plate being pivotally suspended from said suspension link, thereby permitting said support plate to positionally shift to accommodate lengthwise changes in said heating elements without attitude changes of said support plate.

References Cited
UNITED STATES PATENTS

| | | | |
|---|---|---|---|
| 1,817,850 | 8/1931 | Schwalbach | 219—318 X |
| 2,810,815 | 10/1957 | Dicome | 219—336 |
| 2,860,226 | 11/1958 | Williams et al. | 219—318 X |
| 2,911,512 | 11/1959 | Williams | 219—318 X |
| 3,171,016 | 2/1965 | Sukala | 219—318 X |

FOREIGN PATENTS 995,089   6/1965   Great Britain.

ANTHONY BARTIS, *Primary Examiner.*

C. L. ALBRITTON, *Assistant Examiner.*

U.S. Cl. X.R.

165—82; 219—306, 316, 336, 536; 338—316